US011573785B2

(12) United States Patent
Copty et al.

(10) Patent No.: US 11,573,785 B2
(45) Date of Patent: Feb. 7, 2023

(54) PREDICTING CODE VULNERABILITIES USING MACHINE LEARNING CLASSIFIER MODELS TRAINED ON INTERNAL ANALYSIS STATES

(71) Applicant: International Business Machines Corporation, Armonk, NY (US)

(72) Inventors: Fady Copty, Nazareth (IL); Shai Doron, Kibuz Meggido (IL); Reda Igbaria, Umm el-Fahem (IL)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 15/931,857

(22) Filed: May 14, 2020

(65) Prior Publication Data

US 2021/0357207 A1 Nov. 18, 2021

(51) Int. Cl.
*G06F 8/70* (2018.01)
*G06K 9/62* (2022.01)
*G06N 20/00* (2019.01)

(52) U.S. Cl.
CPC ............. *G06F 8/70* (2013.01); *G06K 9/6232* (2013.01); *G06K 9/6256* (2013.01); *G06K 9/6268* (2013.01); *G06N 20/00* (2019.01)

(58) Field of Classification Search
CPC ........ G06F 8/70; G06N 20/00; G06K 9/6232; G06K 9/6256; G06K 9/6268
See application file for complete search history.

(56) References Cited

U.S. PATENT DOCUMENTS

| 2010/0100693 A1* | 4/2010 | Kerley | G06Q 40/00 707/E17.046 |
|---|---|---|---|
| 2016/0085524 A1* | 3/2016 | King | G06F 8/43 717/146 |
| 2017/0192758 A1* | 7/2017 | Apte | G06F 8/76 |
| 2018/0096144 A1 | 4/2018 | Pan et al. | |
| 2018/0174071 A1* | 6/2018 | Bhatt | G06N 20/20 |
| 2019/0044964 A1* | 2/2019 | Chari | H04L 63/145 |

(Continued)

FOREIGN PATENT DOCUMENTS

| CN | 110222512 A | 5/2019 |
|---|---|---|
| KR | 20190064264 A | 11/2017 |

(Continued)

OTHER PUBLICATIONS

He, Xincheng, Lei Xu, and Chunliu Cha. "Malicious javascript code detection based on hybrid analysis." 2018 25th Asia-Pacific Software Engineering Conference (APSEC). IEEE, 2018. (Year: 2018).*

(Continued)

*Primary Examiner* — S. Sough
*Assistant Examiner* — Joanne G Macasiano
(74) *Attorney, Agent, or Firm* — Barry D. Blount (57) ABSTRACT

An example system includes a processor to receive a source code sample to be classified. The processor can execute a hybrid code analysis to generate an internal analysis state. The processor can extract features from the internal analysis state via a trained machine learning model modified using transfer learning. The processor can generate a label based on the extracted features via a machine learning classifier model trained on internal analysis states of hybrid code analyses.

20 Claims, 7 Drawing Sheets

(56) References Cited

U.S. PATENT DOCUMENTS

2020/0082094 A1* 3/2020 Mcallister .................. G06F 8/77
2021/0271587 A1* 9/2021 Miller .................. G06F 11/3604

FOREIGN PATENT DOCUMENTS

KR 101969572 B1 6/2018
WO 2019027106 A1 8/2017

OTHER PUBLICATIONS

Chaulagain, Dewan. Hybrid Analysis of Android Applications for Security Vetting. Diss. Bowling Green State University, 2019. (Year :2019).*

* cited by examiner

PREDICTING CODE VULNERABILITIES USING MACHINE LEARNING CLASSIFIER MODELS TRAINED ON INTERNAL ANALYSIS STATES

BACKGROUND

The present techniques relate to detecting code vulnerabilities. More specifically, the techniques relate to filtering detected code vulnerabilities.

SUMMARY

According to an embodiment described herein, a system can include processor to receive a source code sample to be classified. The processor can also further execute a hybrid code analysis to generate an internal analysis state. The processor can also extract features from the internal analysis state via a trained machine learning model modified using transfer learning. The processor can also further generate a label based on the extracted features via a machine learning classifier model trained on internal analysis states of hybrid code analyses.

According to another embodiment described herein, a computer-implemented method can include receiving, via a processor, a source code sample to be classified. The method can further include executing, via the processor, a hybrid code analysis to generate an internal analysis state. The method can also further include extracting, via the processor, features from the internal analysis state via a trained machine learning model modified using transfer learning. The method can also include generating, via the processor, a label based on the extracted features via a machine learning classifier model trained on internal analysis states of hybrid code analyses.

According to another embodiment described herein, a computer program product for classifying source code can include computer-readable storage medium having program code embodied therewith. The computer readable storage medium is not a transitory signal per se. The program code executable by a processor to cause the processor to receive a source code sample to be classified. The program code can also cause the processor to. The program code can also cause the processor to execute a hybrid code analysis to generate an internal analysis state. The program code can also cause the processor to extract features from the internal analysis state via a trained machine learning model modified using transfer learning. The program code can also cause the processor to generate a label based on the extracted features via a machine learning classifier model trained on internal analysis states of hybrid code analyses.

DETAILED DESCRIPTION

Various types of analysis may be performed to discover code vulnerabilities. Static code analysis may include analysis of a source code. For example, a static code analysis may be performed on source code to detect vulnerabilities using a search for a signature in the code. In some cases, static code analysis may include detection in insecure patterns of coding. However, static code analysis produce many false positives. For example, 1000 alerts may be generated with only 10 alerts being true positives. Furthermore, dynamic code analysis may be used to simulate code to detect vulnerabilities. For example, dynamic code analysis may include symbolic-simulation, constraint solving, or model checking. However, full symbolic-simulation, or full constraint solving may not be scalable to larger code samples. Hybrid static-dynamic analysis tools may be used to perform a static analysis with some shallow dynamic analysis. For example, a shallow simulation of possible values for symbols may be performed to eliminate false positives. However, although a lot of analysis information may be generated by hybrid static-dynamic analysis tools, the hybrid static-dynamic analysis may be deprecated due to resource limits resulting in low accuracy of the analysis.

According to embodiments of the present disclosure, system includes a processor to receive a source code sample to be classified. The processor can execute a hybrid code analysis to generate an internal analysis state. A hybrid code analysis, as used herein, refers to refers to an analysis that combines static code analysis and dynamic code analysis. In some examples, the hybrid code analysis may be executed using a hybrid code analysis tool. For example, the hybrid code analysis tool can augment static analysis with semi-concrete information by applying partial evaluation to functions according to dynamic data recorded by a simulation environment. As used herein, an internal state refers to the memory state of a hybrid analysis tool while performing an analysis on a particular code sample. The processor can extract features from the internal analysis state via a trained machine learning model modified using transfer learning. Transfer learning, as used herein, refers to using a machine learning model trained while solving one problem and applying the machine learning model to a different but related problem via a modification of the original model. The processor can generate a label based on the extracted features via a machine learning classifier model trained on internal analysis states of hybrid code analyses. Thus, techniques of the present disclosure allow reduction of false positives as well as false negatives in code vulnerability detection. Moreover, the techniques described herein are scalable to large datasets. For example, the techniques are able to detect vulnerabilities associated with the use of global variables that hybrid analyses may miss because of being unable to propagate conditions associated with the global variables across functions. In addition, the techniques described herein may detect vulnerabilities that other methods may not detect.

Figure 1:
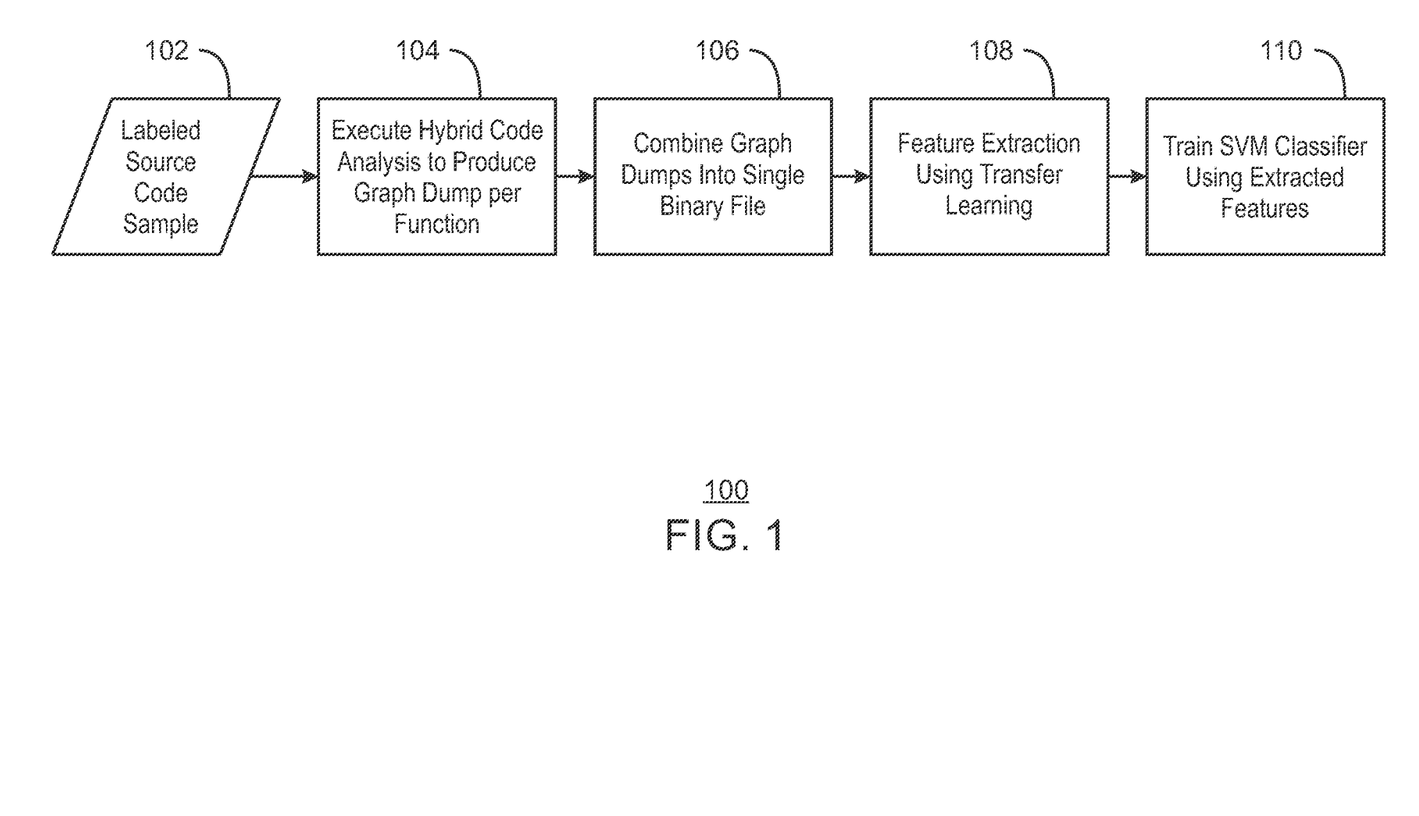
FIG. 1 is a block diagram of an example process for training a machine learning classifier model based on internal states of hybrid code analysis.

With reference now to FIG. 1, a process flow shows an example process for training a machine learning classifier model based on internal states of hybrid code analysis. The process 100 can be implemented with any suitable computing device, such as the computing device 400 of FIG. 4 and in the method 300 of FIG. 3. For example, the methods described below can be implemented by the processor 402 or the processor 702 of FIGS. 4 and 7.

At block 102, a labeled source code sample is received. For example, the labeled source code sample may be received from a data set of code labeled as benign or malicious, or resilient or weak.

At block 104, a hybrid code analysis tool is executed to produce a graph dump per function. As one example, the hybrid code analysis tool can augment a static analysis with semi-concrete information or symbolic information by applying partial evaluation to functions according to dynamic data recorded by a simulation environment. In some examples, a dynamic component of the hybrid code analysis tool rewrites the program per the enclosing environment, and the static component then explores all possible behaviors of the partially evaluated program. In various examples, hybrid code analysis tool is executed with a number of dynamic analysis iterations. For example, each dynamic analysis iteration may leverage information generated in a previous dynamic analysis iteration. In various examples, the hybrid code analysis tool is executed with various time limits. For example, the time limits can be hard coded. In some examples, the time limits can be setup to reflect the time needed to achieve additional significant steps in analysis. For example, the time limits may be setup to provide time for deeper simulation. In some examples, the hybrid code analysis tool is executed using various heuristics to expand analysis. For example, the heuristics may include fuzzying and concolic symbolic execution. In this manner, a number of viewpoints in the form of internal states may be generated based on the same code.

At block 106, the graph dumps are combined into a single binary file. For example, the graph dumps may be concatenated.

At block 108, a feature extraction is performed using transfer learning. For example, a set of features may be extracted from the combined graph dumps. In various examples, transfer learning may include using a set of layers of a deep neural network trained to extract features from objects in a different space to extract the features from the combined graph dumps. For example, the deep neural network used may be based on the MobileNetV2 mobile architecture, released January 2018, or any other suitable deep neural network. In some examples, transfer learning may be performed using any other suitable machine learning algorithm. In some examples, the feature vectors may be concatenated.

At block 110, a support-vector machine (SVM) classifier is trained using the extracted features. In various examples, the SVM receives one input vector for training. For example, the SVM classifier may be a supervised learning model that generates a label in response to receiving the extracted features in the form of a vector. In some examples, a machine learning model may be trained to predict a vulnerability score per line of code. For example, the machine learning model may be a neural network trained to output a line number along with score for each detected vulnerability. In various examples, the output of the machine learning model may be a probability vector per line, instead of the binary label or score label of an SVM classifier. Such a training may enable more fine grained detection of vulnerabilities.

The process flow diagram of FIG. 1 is not intended to indicate that the operations of the process 100 are to be executed in any particular order, or that all of the operations of the process 100 are to be included in every case. Additionally, the process 100 can include any suitable number of additional operations. For example, although an SVM model is generated using the training at block 110, in some examples, any other suitable machine learning model may be trained, such as a neural network, a decision tree, or a random forest model. For example, the machine learning classifier model may be a Naive Bayes classifier for multivariate Bernoulli models, decision tree classifier, an extremely randomized tree classifier, an extra-trees classifier, a Gaussian Naive Bayes classifier, a Label Propagation classifier, a LabelSpreading model for semi-supervised learning, Linear Discriminant Analysis classifier, Linear Support Vector Classifier, Logistic Regression classifier, Multi-layer Perceptron classifier, Nearest centroid classifier, Quadratic Discriminant Analysis Classifier, a classifier implementing a vote among neighbors within a given radius, a random forest classifier, a Classifier using Ridge regression, a ridge classifier with built-in cross-validation, a classifier implementing the k-nearest neighbors vote, a Nu-Support Vector Classifier, a C-Support Vector Classifier, a Gaussian process classification (GPC) based on Laplace approximation, Classifier with Gradient Boosting, a Gaussian process Classifier (GPC) based on Laplace approximation, Linear Support Vector Classifier, Passive Aggressive Classifier, or Linear classifiers with stochastic gradient descent (SGD) training, or any other suitable classifier. In various examples, if a neural network is used, a loss function may be used to calculate a loss based on the output label and a ground truth label of the labeled source code sample. The calculated loss may be back propagated through the neural network to modify one or more weights of the neural network. In various examples, the neural network may be trained using additional labeled source code samples for a predetermined number of iterations or until a convergence is reached. For example, a convergence may be detected when the modification of the weights is below a threshold value. Moreover, although concatenation of graph dumps and features is described above, in various examples, no concatenation may be performed. For example, no concatenation may be performed if the hybrid code analysis tool dumps one file.

Figure 2:
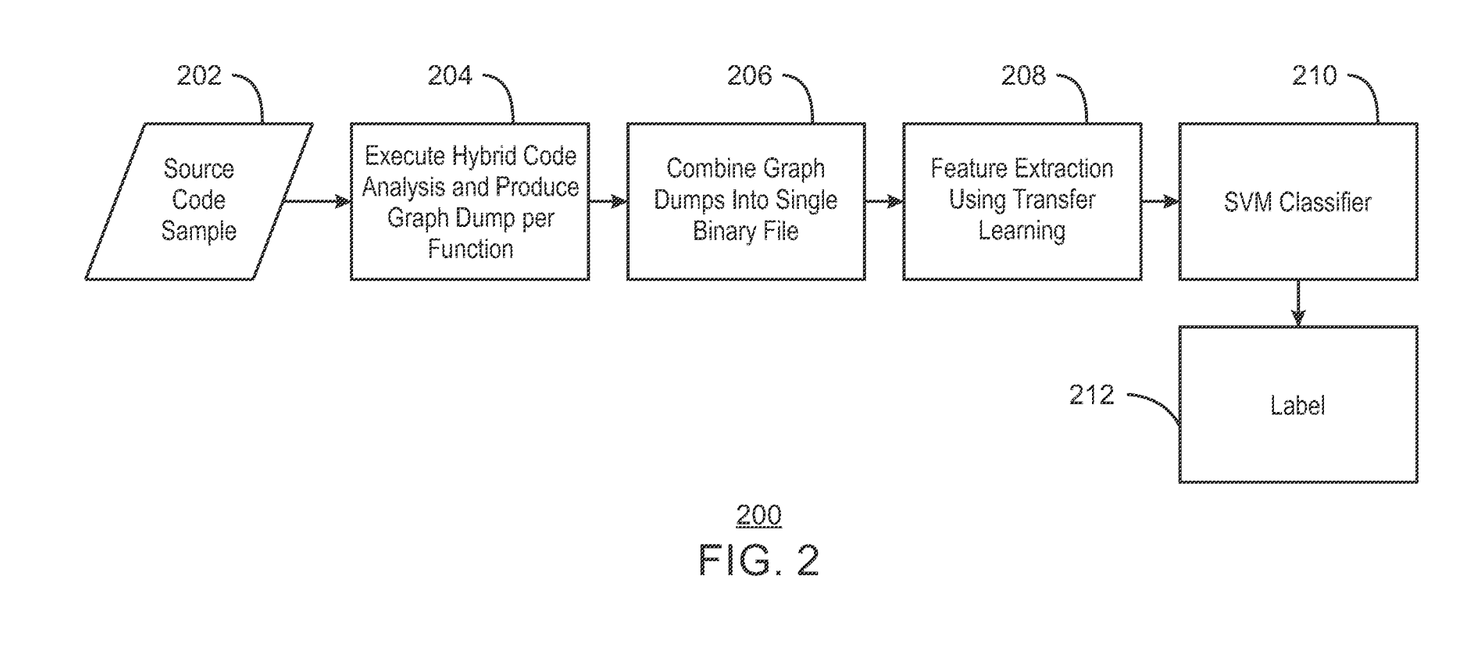
FIG. 2 is a block diagram of an example process for predicting code vulnerability using a machine learning classifier model trained on internal states of a hybrid code analysis.

FIG. 2 is a process flow diagram of an example process for predicting code vulnerability using a machine learning classifier model trained on internal states of a hybrid code analysis. The process 200 can be implemented with any suitable computing device, such as the computing device 400 of FIG. 4 and in the method 300 of FIG. 3. For example, the methods described below can be implemented by the processor 402 or the processor 702 of FIGS. 4 and 7.

At block 202, a source code sample is received. For example, the source code sample may include one or more vulnerabilities to be detected.

At block 204, hybrid code analysis tool is executed to produce a graph dump per function. In some examples, hybrid code analysis tool is executed with a number of dynamic analysis iterations. In this manner, a number of viewpoints in the form of internal states may be generated based on the source code sample.

At block 206, the graph dumps are combined into a single binary file. For example, the graph dumps may be concatenated. In some examples, multiple binary files may be generated by concatenating graph dumps of more than one internal state.

At block 208, a feature extraction is performed using transfer learning. For example, a set of features may be extracted from the combined graph dumps. In various examples, transfer learning may include using a set of layers of a deep neural network trained to extract features from objects in a different space to extract the features from the combined graph dumps. For example, the deep neural network used may be the MobileNetV2, or any other suitable deep neural network. In some examples, the feature vectors may be concatenated.

At block 210, an SVM classifier receives the extracted features and outputs a label 212. For example, the label 212 may be a binary value that indicates that the source code sample is either a vulnerability or not. In some examples, the SVM classifier may be replaced by a neural network that may receive the extracted features output a label for each line of code in the source code sample 202.

The process flow diagram of FIG. 2 is not intended to indicate that the operations of the process 200 are to be executed in any particular order, or that all of the operations of the process 200 are to be included in every case. In some examples, any suitable machine learning model may be used to execute the process 200 in place of the SVM classifier. Additionally, the process 200 can include any suitable number of additional operations.

Figure 3:
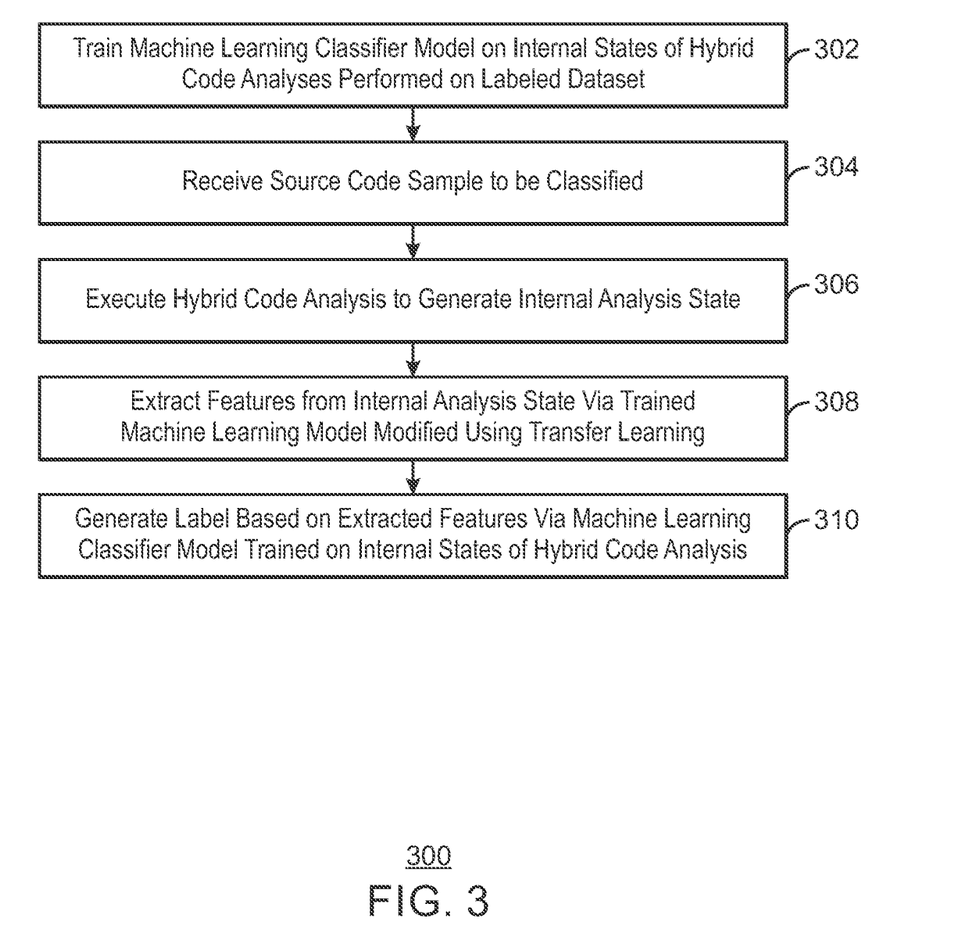
FIG. 3 is a block diagram of an example method that can predict code vulnerability using a machine learning classifier model trained on internal states of a hybrid code analysis.

FIG. 3 is a process flow diagram of an example method that can predict code vulnerability using a machine learning classifier model trained on internal states of a hybrid code analysis. The method 300 can be implemented with any suitable computing device, such as the computing device 400 of FIG. 4 and is described with reference to the systems 100 and 200 of FIGS. 1 and 2. For example, the method 300 can be implemented by the processor 402 or the processor 702 of FIGS. 4 and 7.

At block 302, a machine learning classifier model is trained on internal states of hybrid code analyses performed on a labeled dataset. For example, the labeled dataset may include a labeled source code used for training. For example, a labeled source code sample may be received. A hybrid code analysis may be executed to generate one or more internal analysis states. Features may be extracted from the one or more internal analysis states via a trained machine learning model modified using transfer learning. The machine learning classifier model may then be trained to generate a label based on the extracted features. For example, the machine learning classifier model may be trained using the process 100 of FIG. 1.

At block 304, a source code sample to be classified is received. For example, the source code sample may include one or more vulnerabilities.

At block 306, a hybrid code analysis is executed to generate an internal analysis state. In some examples, a number of dynamic analysis iterations may be executed to construct a number of internal analysis states. For example, each iteration receive as input information generated by a previous dynamic analysis iteration perform dynamic analysis on the input information. In some examples, the hybrid code analysis may be executed with various time limits to generate a number of internal analysis states. In various examples, a graph dump per function of the source code sample may be generated and the graph dumps combined into a single binary file.

At block 308, features are extracted from the internal analysis state via a trained machine learning model that is modified using transfer learning. For example, one or more layers of a deep neural network trained on different data may be used to extract the features.

At block 310, a label is generated based on the extracted features via a machine learning classifier model trained on internal analysis states of hybrid code analyses. For example, the label may be "vulnerable" or "not vulnerable."

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

In some scenarios, the techniques described herein may be implemented in a cloud computing environment. As discussed in more detail below in reference to at least FIGS. 4-7, a computing device configured to filter vulnerabilities using machine learning models trained on internal states of hybrid code analysis may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
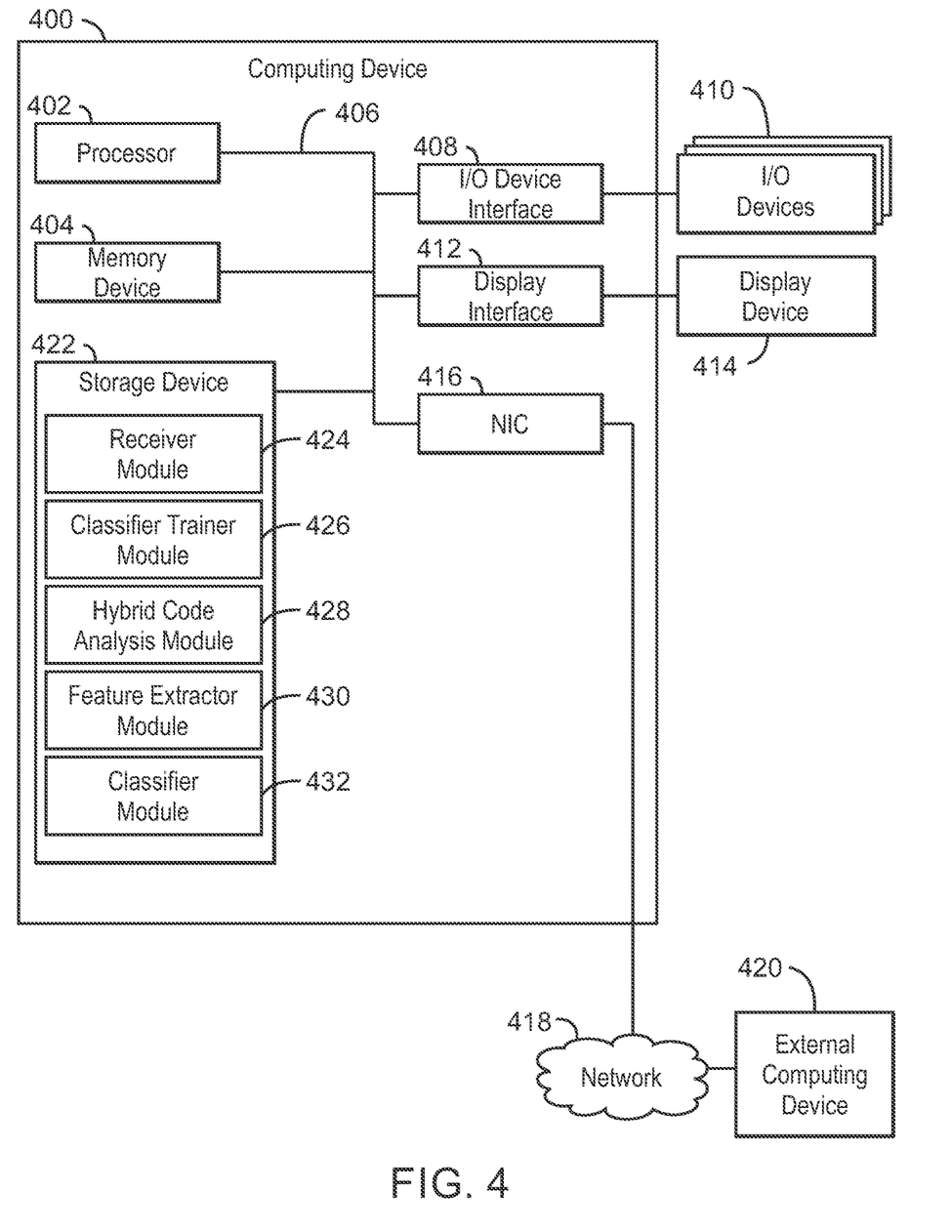
FIG. 4 is a block diagram of an example computing device that can predict code vulnerability using a machine learning classifier model trained on internal states of a hybrid code analysis.

FIG. 4 is block diagram of an example computing device that can predict code vulnerability using a machine learning classifier model trained on internal states of a hybrid code analysis. The computing device 400 may be for example, a server, desktop computer, laptop computer, tablet computer, or smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external webserver 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include a receiver module 424, a classifier trainer module 426, a hybrid code analysis module 428, a feature extractor module 430, and a classifier module 432. The receiver module 424 can receive a source code sample to be classified. The classifier trainer module 426 can receive a labeled source code sample. The classifier trainer module 426 can also execute a hybrid code analysis to generate one or more internal analysis states. The classifier trainer module 426 can extract features from the one or more internal analysis states via a trained machine learning model modified using transfer learning. The classifier trainer module 426 can then train the machine learning classifier model to generate a label based on the extracted features. The hybrid code analysis module 428 can execute a hybrid code analysis to generate an internal analysis state. In some examples, the hybrid code analysis module 428 can execute a number of dynamic analysis iterations to construct a number of internal analysis states from which the features are extracted. For example, each of the dynamic analysis iterations may receive as input information generated by a previous dynamic analysis iteration. In some examples, the hybrid code analysis module 428 can execute the hybrid code analysis with various time limits to generate a number of internal analysis states. For example, an internal analysis state may include an internal representation of code analysis results or generated alerts. In various examples, the hybrid code analysis module 428 can generate a graph dump per function of the source code sample and combine the graph dumps into a single binary file. The feature extractor module 430 can extract features from the internal analysis state via a trained machine learning model modified using transfer learning. The classifier module 432 can generate a label based on the extracted features via a machine learning classifier model trained on internal analysis states of hybrid code analyses. For example, the classifier module 432 may include a machine learning classifier model trained to predict a vulnerability score per line of code. For example, the machine learning classifier model may be a support-vector machine, a neural network, a decision tree, or a random forest model. In some examples, the machine learning classifier model may be trained to receive an input vector of alerts and output a new vector of alerts.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). Furthermore, any of the functionalities of the receiver module 424, the classifier trainer module 426, the hybrid code analysis module 428, the feature extractor module 430, and the classifier module 432, may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the receiver module 424, the classifier trainer module 426, the hybrid code analysis module 428, the feature extractor module 430, and the classifier module 432 can be implemented with logic, wherein the logic, as referred to herein, can include any suitable hardware (e.g., a processor, among others), software (e.g., an application, among others), firmware, or any suitable combination of hardware, software, and firmware.

Figure 5:
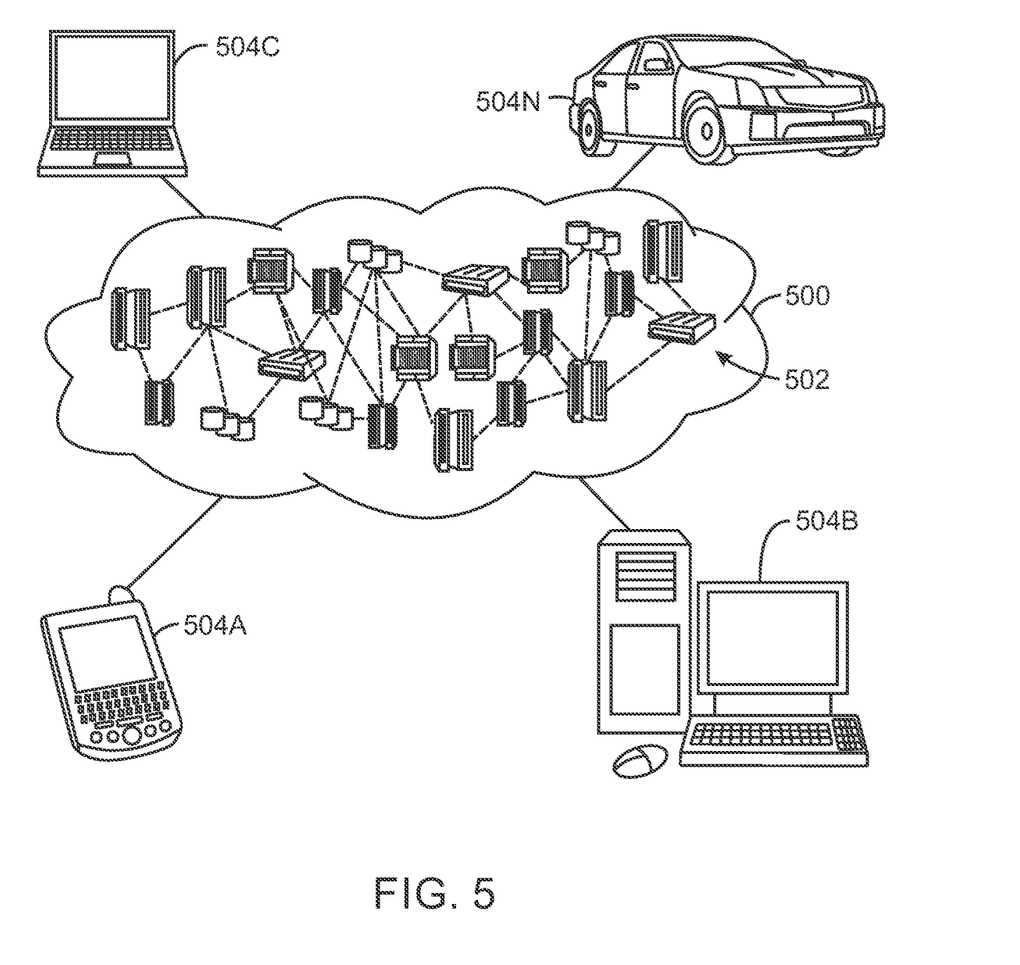
FIG. 5 is a diagram of an example cloud computing environment according to embodiments described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
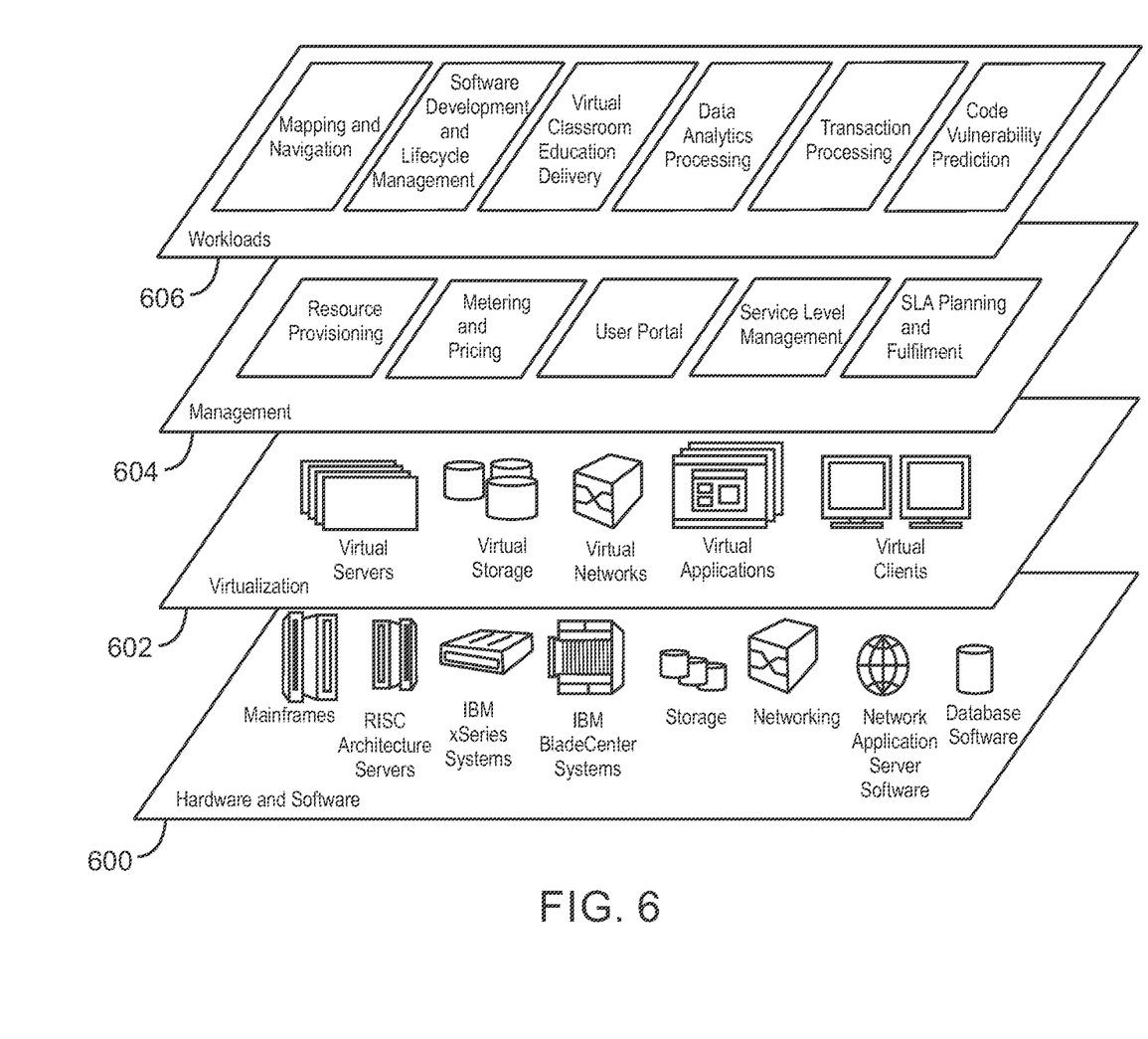
FIG. 6 is a diagram of an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and code vulnerability prediction.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
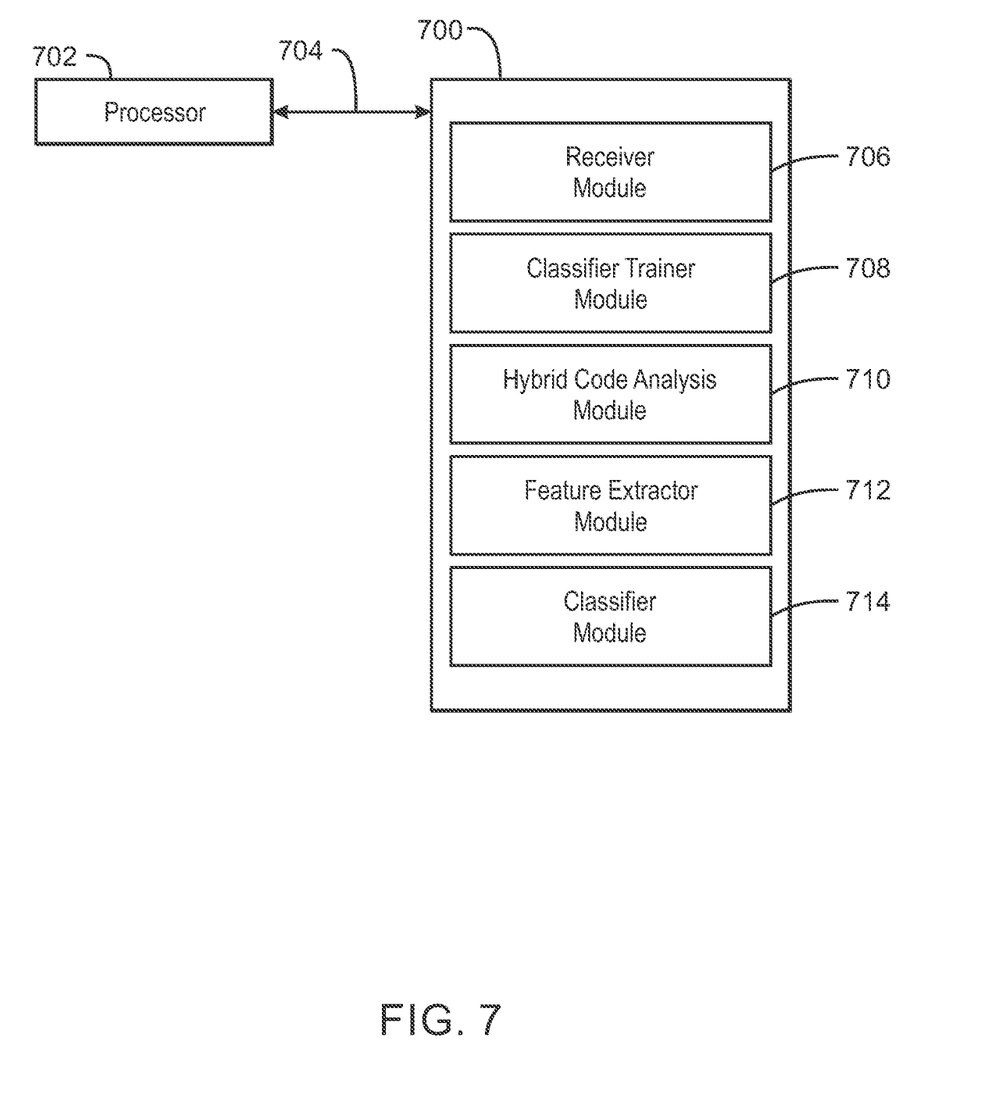
FIG. 7 is an example tangible, non-transitory computer-readable medium that can predict code vulnerability using a machine learning classifier model trained on internal states of a hybrid code analysis.

Referring now to FIG. 7, a block diagram is depicted of an example tangible, non-transitory computer-readable medium 700 that can predict code vulnerability using a machine learning classifier model trained on internal states of a hybrid code analysis. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the method 300 of FIG. 3 or the processes 100 and 200 of FIGS. 1 and 2.

The various software components discussed herein may be stored on the tangible, non-transitory, computer-readable medium 700, as indicated in FIG. 7. For example, a receiver module 706 includes code to receive a source code sample to be classified. A classifier trainer module 708 includes code to receive a labeled source code sample. The classifier trainer module 708 further includes code to execute a hybrid code analysis to generate one or more internal analysis states. The classifier trainer module 708 also includes code to extract features from the one or more internal analysis states via a trained machine learning model modified using transfer learning. In some examples, the classifier trainer module 708 further includes code to train the machine learning classifier model to generate a label based on the extracted features. A hybrid code analysis module 710 includes code to execute a hybrid code analysis to generate an internal analysis state. The hybrid code analysis module 710 also includes code to execute a number of dynamic analysis iterations to construct a number of internal analysis states from which the features are extracted. For example, the hybrid code analysis module 710 may include code to receive as input information generated by a previous dynamic analysis iteration and perform dynamic analysis on the input information. In some examples, the hybrid code analysis module 710 also includes code to execute the hybrid code analysis with various time limits to generate the number of internal analysis states. In some examples, the hybrid code analysis module 710 may include code to generate a graph dump per function of the source code sample and combine the graph dumps into a single binary file. A feature extractor module 712 includes code to extract features from the internal analysis state via a trained machine learning model modified using transfer learning. A classifier module 714 includes code to generate a label based on the extracted features via a machine learning classifier model trained on internal analysis states of hybrid code analyses. It is to be understood that any number of additional software components not shown in FIG. 7 may be included within the tangible, non-transitory, computer-readable medium 700, depending on the particular application.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 7 may be included within the tangible, non-transitory, computer-readable medium 700, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor configured to:
receive a source code sample to be classified;
execute a hybrid code analysis on the source code sample to generate an internal analysis state comprising a memory state of a hybrid analysis tool performing the hybrid code analysis on the source code sample, wherein the hybrid code analysis comprises a static analysis augmented with semi-concrete information from a partial evaluation of functions according to dynamic data recorded by a simulation environment;
extract features from the internal analysis state via a trained machine learning model modified using transfer learning; and
generate a label based on the extracted features via a machine learning classifier model trained on internal analysis states of hybrid code analyses.

2. The system of claim 1, wherein the processor is configured to execute a plurality of dynamic analysis iterations to construct a plurality of internal analysis states from which the features are extracted.

3. The system of claim 2, wherein each of the dynamic analysis iterations receives as input information generated by a previous dynamic analysis iteration.

4. The system of claim 1, wherein the processor is configured to execute the hybrid code analysis with various time limits to generate a plurality of internal analysis states.

5. The system of claim 1, wherein the internal analysis state comprises an internal representation of code analysis results or generated alerts.

6. The system of claim 1, wherein the machine learning classifier model is trained to predict a vulnerability score per line of code.

7. The system of claim 1, wherein the machine learning classifier model is trained to receive an input vector of alerts and output a new vector of alerts.

8. The system of claim 1, wherein the machine learning classifier model comprises a support-vector machine, a neural network, a decision tree, or a random forest model.

9. A computer-implemented method, comprising:
receiving, via a processor, a source code sample to be classified;
executing, via the processor, a hybrid code analysis on the source code sample to generate an internal analysis state comprising a memory state of a hybrid analysis tool performing the hybrid code analysis on the source code sample, wherein the hybrid code analysis comprises a static analysis augmented with semi-concrete information from a partial evaluation of functions according to dynamic data recorded by a simulation environment;
extracting, via the processor, features from the internal analysis state via a trained machine learning model modified using transfer learning; and
generating, via the processor, a label based on the extracted features via a machine learning classifier model trained on internal analysis states of hybrid code analyses.

10. The computer-implemented method of claim 9, comprising executing a plurality of dynamic analysis iterations to construct a plurality of internal analysis states from which the features are extracted.

11. The computer-implemented method of claim 10, wherein executing the plurality of dynamic analysis iterations comprises receiving as input information generated by a previous dynamic analysis iteration.

12. The computer-implemented method of claim 9, comprising executing the hybrid code analysis with various time limits to generate a plurality of internal analysis states.

13. The computer-implemented method of claim 9, comprising training the machine learning classifier model, wherein training the machine learning classifier model comprises:
receiving, via the processor, a labeled source code sample;
executing, via the processor, a second hybrid code analysis on a labeled source code sample to generate one or more internal analysis states;
extracting, via the processor, a second set of features from the one or more internal analysis states via a second trained machine learning model modified using transfer learning; and
training, via the processor, the machine learning classifier model to generate a label based on the second set of extracted features.

14. The computer-implemented method of claim 9, wherein executing the hybrid code analysis comprises generating a graph dump per function of the source code sample and combining the graph dumps into a single binary file.

15. A computer program product for classifying source code, the computer program product comprising a computer-readable storage medium having program code embodied therewith, the program code executable by a processor to cause the processor to:
- receive a source code sample to be classified;
- execute a hybrid code analysis to generate an internal analysis state comprising a memory state of a hybrid analysis tool performing the hybrid code analysis on the source code sample, wherein the hybrid code analysis comprises a static analysis augmented with semi-concrete information from a partial evaluation of functions according to dynamic data recorded by a simulation environment;
- extract features from the internal analysis state via a trained machine learning model modified using transfer learning; and
- generate a label based on the extracted features via a machine learning classifier model trained on internal analysis states of hybrid code analyses.

16. The computer program product of claim 15, comprising program code executable by the processor to execute a plurality of dynamic analysis iterations to construct a plurality of internal analysis states from which the features are extracted.

17. The computer program product of claim 15, comprising program code executable by the processor to receive as input information generated by a previous dynamic analysis iteration, and perform dynamic analysis on the input information.

18. The computer program product of claim 15, comprising program code executable by the processor to execute the hybrid code analysis with various time limits to generate a plurality of internal analysis states.

19. The computer program product of claim 15, comprising program code executable by the processor to:
- receive a labeled source code sample;
- execute a second hybrid code analysis to generate one or more internal analysis states;
- extract a second set of features from the one or more internal analysis states via a second trained machine learning model modified using transfer learning; and
- train the machine learning classifier model to generate a label based on the second set of extracted features.

20. The computer program product of claim 15, comprising program code executable by the processor to generate a graph dump per function of the source code sample and combine the graph dumps into a single binary file.

* * * * *